US009023267B2

(12) United States Patent
Haupt et al.

(10) Patent No.: US 9,023,267 B2
(45) Date of Patent: May 5, 2015

(54) FLOATING CORE FOR GLASS INSERT MOLDING METHOD AND APPARATUSES THEREFROM

(71) Applicant: Motorola Mobility LLC, Libertyville, IL (US)

(72) Inventors: Eric J. Haupt, Round Lake Beach, IL (US); Joseph L. Allore, Mundelein, IL (US); Michael J. Formenti, Channahon, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 80 days.

(21) Appl. No.: 13/964,252

(22) Filed: Aug. 12, 2013

(65) Prior Publication Data

US 2014/0339738 A1 Nov. 20, 2014

Related U.S. Application Data

(60) Provisional application No. 61/825,238, filed on May 20, 2013.

(51) Int. Cl.
*B29C 45/14* (2006.01)
*B29C 45/36* (2006.01)
B29C 45/27 (2006.01)

(52) U.S. Cl.
CPC ........... *B29C 45/36* (2013.01); *B29C 2045/363* (2013.01); *B29C 2045/14163* (2013.01); *B29C 45/2701* (2013.01); *B29C 45/14065* (2013.01)

(58) Field of Classification Search
CPC ........... B29C 2045/14434; B29C 2045/14065; B29C 2045/14163; B29C 45/2701; B29C 2045/363; B29C 45/36
USPC ............... 264/279, 328.7, 328.13; 425/129.1, 425/575, 577
See application file for complete search history.

(56) References Cited

U.S. PATENT DOCUMENTS

| | | | | | |
|---|---|---|---|---|---|
| 2,524,858 | A | * | 10/1950 | Thomas | 425/573 |
| 3,071,814 | A | * | 1/1963 | Guggenheim | 264/320 |
| 3,972,668 | A | * | 8/1976 | Cessna, Jr. | 425/594 |
| 4,618,466 | A | * | 10/1986 | McGlashen et al. | 264/40.6 |
| 5,776,407 | A | * | 7/1998 | Takeda | 264/328.7 |
| 7,857,615 | B2 | | 12/2010 | Zha et al. | |
| 8,263,211 | B2 | | 9/2012 | Nishimura | |
| 2004/0227272 | A1 | * | 11/2004 | Saito | 264/259 |
| 2010/0159183 | A1 | | 6/2010 | Nishimura | |
| 2010/0285260 | A1 | | 11/2010 | Bookbinder et al. | |
| 2012/0044590 | A1 | | 2/2012 | Alcazar | |

OTHER PUBLICATIONS

Tech, Mold Building, http://www.ttmp.com/tooling.html, downloaded from internet Jun. 12, 2013, all pages.

* cited by examiner

*Primary Examiner* — Jill Heitbrink
(74) *Attorney, Agent, or Firm* — Leydig, Voit & Mayer, Ltd.

(57) ABSTRACT

A tool (1000) includes a mold defining a cavity (1002). The cavity can be for receiving a glass layer (402). A floating core insert (1001) can be placed in the cavity to apply a preloading force against a first major face of the glass layer, preclude an overmolding operation on the first major face, and allow overmolding only on minor faces of the glass layer when polymeric material (1100) is injected into runners (1018, 1019,1020) of the tool.

20 Claims, 11 Drawing Sheets

FIG. 18

FLOATING CORE FOR GLASS INSERT MOLDING METHOD AND APPARATUSES THEREFROM

BACKGROUND

1. Technical Field

This disclosure relates generally to molding, and more particularly to insert molding.

2. Background Art

Injection molding of plastic parts is important for many electronic products. Injection molding processes known as "insert molding" have been used in conjunction with metal parts. Insert molding is also commonly referred to as "overmolding." Illustrating by example, electrical connectors that include metal components disposed in a plastic housing may be formed by insert molding.

While the insert molding process allows for the formation of complex shapes and dimensional control, plastic parts themselves have qualities that are often undesirable. For example, many insert-molded parts are quite thick and have problematic plastic termination lines. Such parts are less suitable for use in modern electronic equipment due to the fact that consumer are demanding smaller and thinner devices. It would be advantageous to have an improved process that yielded better parts.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a pressure-reinforced floating core insert that can be placed in a cavity of a mold used in an insert molding process. Advantageously, use of the floating core insert allows a glass or other material insert-molded article, such as a fascia assembly for a portable electronic device, to have no step or other feature on either the top surface or the bottom surface of the glass. Moreover, using the floating core insert advantageously results in no flash along the mold parting line. In one or more embodiments, a runner is created in the floating core insert so that plastic or other polymeric material can pass through the runner when being introduced into the core. The polymeric material in the runner provides a loading force to a glass layer disposed in the cavity. Accordingly, this results in pressure pushing downward on the glass layer. The pressure closes any gaps or space between the floating core insert and the glass layer, resulting in a finished product that is both flash-free and step-free along its major faces.

In one or more embodiments, the floating core insert defines a block and a runner plate. In one embodiment, the runner plate is wider than the block and defines at least one side of a runner channel within a tool. Having the runner plate wider than the block allows for increased loading forces to be applied to a substrate layer due to the fact that the polymeric material, which is injected at pressure, applies that pressure to an expanded surface area due to the large size of the runner plate. The larger runner plate accordingly results in larger pressure applying the loading force to the glass or other layer in the substrate.

Figure 1:
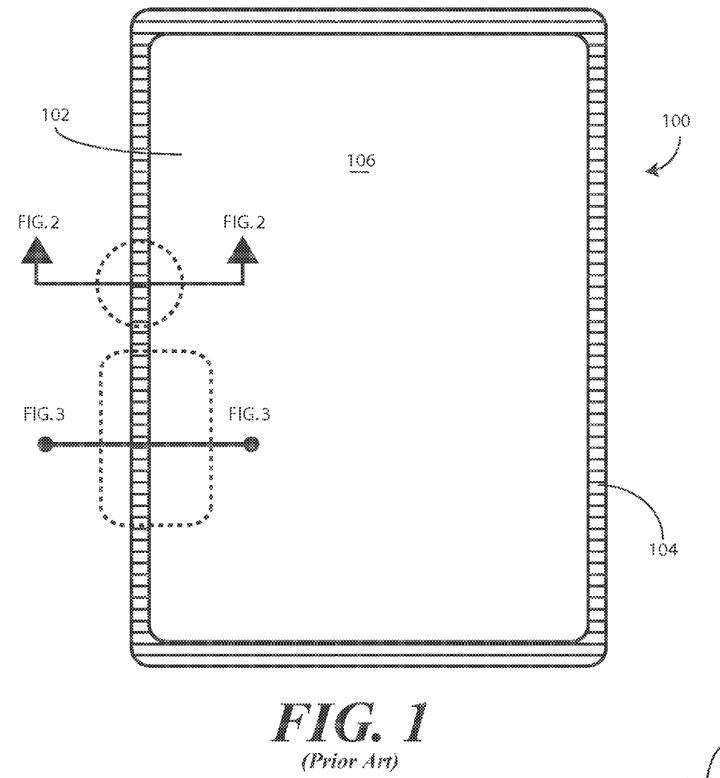
FIG. 1 illustrates a prior art insert molded article.

FIG. 1 illustrates a prior art glass article 100 that has been manufactured using a prior art insert molding process. Such a process is described in US Published Patent Application No. 2010/0285260 to Bookbinder et al., which is incorporated by reference herein for all purposes.

The prior art glass article 100 a glass article 100 includes a glass substrate 102 and a polymer overmold 104. The glass substrate 102 has a first face 106, a second face (108) located opposite the first face 106, and a perimeter edge. The polymer overmold 104 is attached to the entire perimeter edge of the glass substrate 102.

Figure 2:
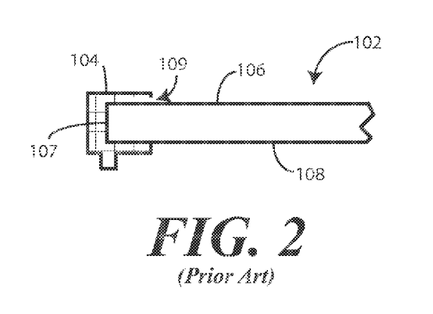
FIG. 2 illustrates a sectional view of the prior art insert molded article.
Figure 3:
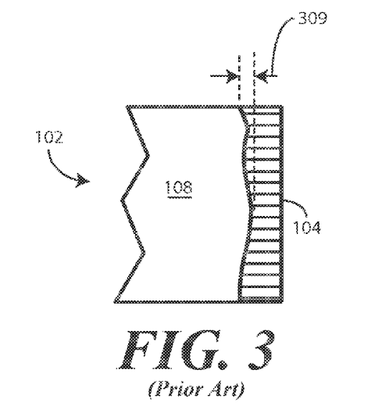
FIG. 3 illustrates view of a portion of the prior art insert molded article.

FIGS. 2 and 3 illustrate a sectional view and plan portion view, respectively, of the prior art glass article 100 as indicated by the section lines shown in FIG. 1. As shown in FIG. 2, the polymer overmold 104 attaches to the first face 106, the second face 108, and the minor face 107 joining the first face 106 and the second face 108.

This "c-shaped" wraparound can cause various problems in practice. A first problem is that there is a sufficient amount of heat delivered to the glass substrate 102 that it can warp during molding, thereby rendering it unusable for an electronic device. A second problem is that gaps 109 can form between the glass substrate 102 and the polymer overmold 104. Experimental testing has shown that gaps as large as 0.08 millimeters can arise using the process of the '260 application. At best, when the gap 109 appears, the glass substrate will become loose within the polymer overmold 104. A worse scenario occurs when the prior art glass article 100 is used in an electronic device, as water, dust, and debris can sometimes pass through the gap 109 into the device, thereby compromising reliability.

A third problem is shown in FIG. 3. As glass passes over the major faces of the glass substrate 102, which is the second face 108 in FIG. 3, a wavy and unsightly cosmetic edge results. Experimental testing has shown that this wavy edge can have variation 309 of about 0.015 millimeters, which is not only unsightly, but causes the glass substrate 102 to again become loose.

Embodiments of the present disclosure eliminate all of these problems by providing a method and system for insert molding that does not allow polymer to attach to the major faces of a glass substrate. In one embodiment, a floating core insert is preloaded against a glass layer prior to introducing polymeric material into the tool. This preloading seats the glass layer within the cavity and allows the polymeric material to pass only about the minor faces of the glass layer. As a result, advantageously, wavy cosmetic lines and gaps are eliminated. Moreover, the resulting part allows for thinner and sleeker electronic device designs.

Figure 4:
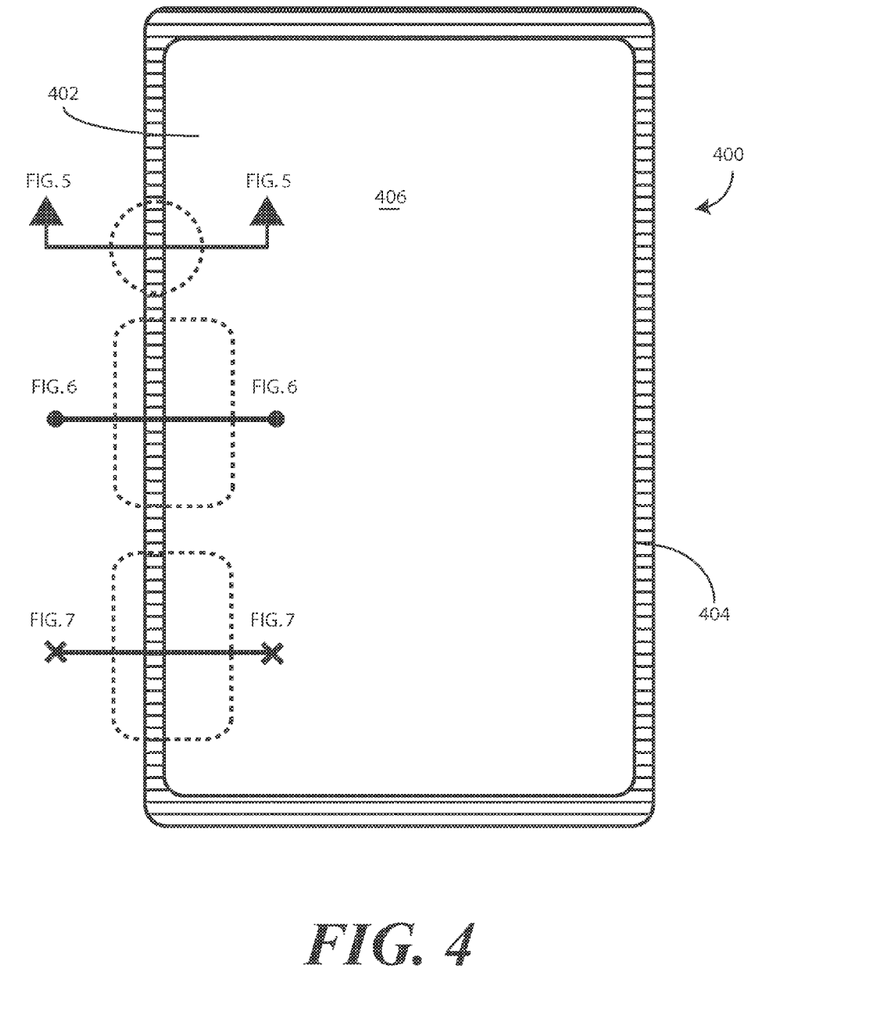
FIG. 4 illustrates an explanatory embodiment of one insert molded part configured in accordance with one or more embodiments of the disclosure.

Turning now to FIG. 4, illustrated therein is an explanatory embodiment of an apparatus 400 configured in accordance with one or more embodiments of the disclosure. For illustrative purposes, the apparatus 400 will be described as a fascia assembly for a portable electronic device. However, it will be obvious to those of ordinary skill in the art having the benefit of this disclosure that the apparatus 400 can be any of a number of other devices that employ a glass layer 402 with a polymer overmold 404 applied by an insert molding process. Note that while glass is used as an explanatory material for discussion purposes, layers of other material could be substituted for the glass layer 402. For example, a polycarbonate layer could be substituted for the glass layer 402. Accordingly, the glass layer 402 is representative for any number of substrate layers made from other materials that will be obvious to those of ordinary skill in the art having the benefit of this disclosure.

As used herein, a "fascia assembly" is a covering or housing for an electronic device, which may or may not be detachable when the electronic device is finally assembled. Suitable materials for manufacturing the fascia assembly include clear or translucent plastic film, glass, ceramics, plastic, or reinforced glass. The glass layer 402 of FIG. 4 will be used for illustrative purposes. Where reinforced glass is used, such glass can comprise glass strengthened by a process such as a chemical or heat treatment.

The glass layer 402 may also include a ultra-violet barrier, which can be applied before or after the insert molding process. Such a barrier is useful both in improving the visibility of display assembly above which the apparatus 400 is disposed. The barrier can also be used to protect protecting internal components of the electronic device.

Selective printing can be deposited on the glass layer 402 as well. When the apparatus 400 is used as a fascia assembly, it can be used with electronic devices having a display, a keyboard, or both. Where printing is used, in one embodiment the printing is disposed on the rear face (408) of the glass layer 402. By printing on the rear face (408) of the glass layer 402, the front face 406 remains smooth and glossy. Additionally, the printing, being disposed on the inside of the device, is protected from wear and abrasion. It will be clear to those of ordinary skill in the art having the benefit of this disclosure that the printing could equally be done on the front face 406. There may even be advantages in doing so, including offering unique textural effects on the exterior of the electronic device. Examples of how fascia assemblies can be used in electronic devices are found in commonly assigned, copending U.S. Ser. No. 11/427,444 to Baw et al., filed Jun. 29, 2006, which is incorporated herein by reference for all purposes.

The front face 406 and the rear face (408) each comprise the major faces of the glass layer 402. The side edges constitute the minor faces of the glass layer 402. This will be more readily visible with reference to FIG. 5 below.

In one or more embodiments, the glass layer 402 can be substantially planar. In other embodiments, the glass layer 402 can be contoured, such as having a convex front face 406, concave rear face (408), or both. Optional features can be incorporated into the glass layer 402, including microlens arrays, filters, lenses, and so forth. Other configurations of the glass layer 402 will be obvious to those of ordinary skill in the art having the benefit of this disclosure.

While the illustrative embodiment of FIG. 4 depicts a glass layer 402 that is substantially rectangular shaped glass layer 402, those of ordinary skill in the art having the benefit of this disclosure will recognize that the glass layer 402 may be formed in other shapes as well. For example, and without limitation, the shaped glass substrate may be circular, square or any other regular or free form shape.

Figure 5:
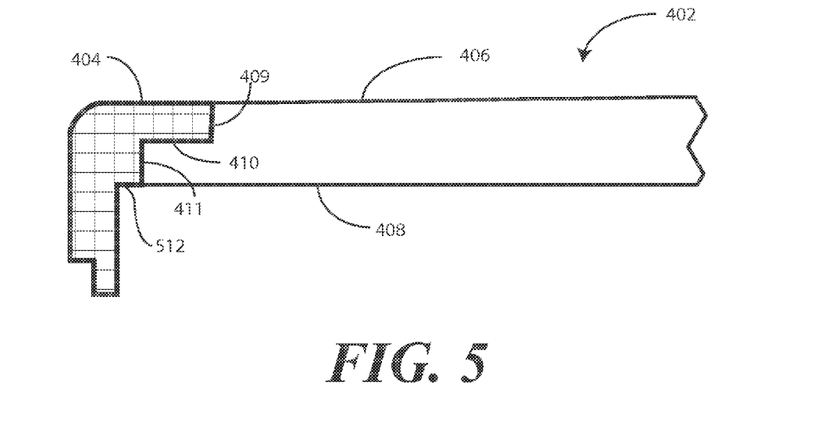
FIG. 5 illustrates a sectional view of one explanatory embodiment of one insert molded part configured in accordance with one or more embodiments of the disclosure.
Figure 6:
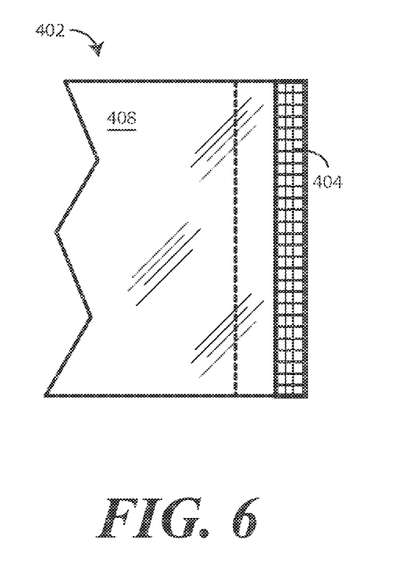
FIG. 6 illustrates a top plan view of a portion of one explanatory embodiment of one insert molded part configured in accordance with one or more embodiments of the disclosure.
Figure 7:
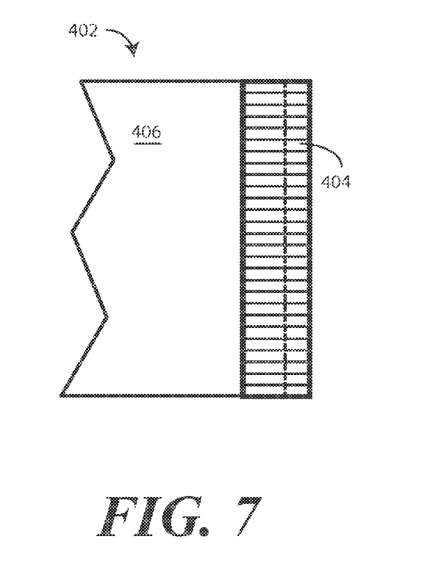
FIG. 7 illustrates a bottom plan view of a portion of one explanatory embodiment of one insert molded part configured in accordance with one or more embodiments of the disclosure.

Turning to FIG. 5, illustrated therein is a sectional view of the apparatus (400). FIGS. 6-7 illustrate a sectional view and plan portion view, respectively, of the apparatus (400). Reference of the sectional and plan portion views for each of FIGS. 5-7 are identified in FIG. 4 by figure number. These figures, and in particular FIG. 5, illustrate one of the primary advantages offered by embodiments of the disclosure, namely, that all portions of the polymer overmold 404 attaching to the glass layer 402 attach along the minor faces 409,

410,411. This completely eliminates the problems of gaps and unsightly wavy cosmetic lines along the major faces of the glass layer 402, which are the front face 406 and the rear face 408. No polymer attaches to either major face, i.e., either to the front face 406 or the rear face 408, in this embodiment.

In this illustrative embodiment, the rear face 408 has less area than the front face 406 due to the fact that the minor faces 409,410,411 are stair-stepped inward from an outer perimeter of the rear face 408 to the outer perimeter of the front face 406. In this illustrative embodiment, there is a single stair step. However it will be obvious to those of ordinary skill in the art that the minor faces 409,410,411 could define more stair steps.

In this illustrative embodiment, the polymer overmold 404 extends from a plane defined by the rear face 408 to a termination angle 512 disposed beyond a perimeter of the rear face 408. Accordingly, the "composite rear face" is defined by the rear face 408 and portions of the polymer overmold between minor face 411, disposed at the perimeter of the rear face, and termination angle 512.

Stair steps are not the only minor face geometry that can be used to make the front face 406 have a lesser area than the rear face 408. Turning now to FIGS. 8-11, illustrated therein are alternate apparatuses having different minor face geometries. Each geometry results, however, in a first major face having less area than a second major face. While the convention to this point has been to have a front side smaller than the rear side, it should be noted that the opposite convention can also be used. The front face can be larger than the rear face in one or more embodiments. The illustrative embodiments of FIGS. 8-11 do not include the termination angle (512) shown in FIG. 5. However, it will be clear to those of ordinary skill in the art having the benefit of this disclosure that they could so as to define a composite face having a planar surface area greater than the minor faces of each figure.

Figure 8:
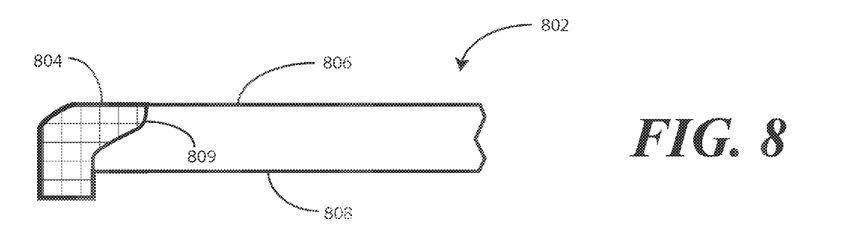
FIG. 8 illustrates a sectional view of one explanatory embodiment of one insert molded part configured in accordance with one or more embodiments of the disclosure.

Beginning with FIG. 8, illustrated therein is an apparatus where the glass layer 802 has a first major face 806, a second major face 808, and one or more minor faces 809. In this illustrative embodiment, the minor face 809 has a curvilinear shape. The illustrative curvilinear shape includes one convex portion and one concave portion. That the curvilinear shape begins at a perimeter of the second major face 808, moves through a first convex portion to a first concave portion to the perimeter of the first major face 806 results in the first major face 806 having less area than the second major face 808. As with the embodiment of FIG. 4, the polymer overmold 804 attaches only to the minor face 809, and does not attach to either the first major face 806 or the second major face 808.

In any of the embodiments herein, the minor faces 809 can be continuous about a perimeter of the glass layer 802, or may be discontinuous. Where continuous, the minor face 809 can have the same shape along the entirety of the perimeter. Where discontinuous, the minor face 809 can take different shapes along the perimeter. Illustrating by example, some segments could be stair stepped, as shown in FIG. 5, while other segments could be curvilinear, as shown in FIG. 8, or take other shapes. Other configurations for the minor faces will be obvious to those of ordinary skill in the art having the benefit of this disclosure.

Figure 9:
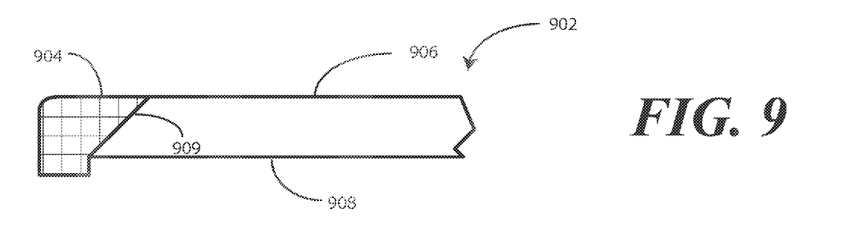
FIG. 9 illustrates a sectional view of one explanatory embodiment of one insert molded part configured in accordance with one or more embodiments of the disclosure.

Turning now to FIG. 9, illustrated therein is an apparatus where the glass layer 902 has a first major face 906, a second major face 908, and one or more minor faces 909. In this illustrative embodiment, the minor face 909 has a linear shape. The illustrative linear shape tapers inward from a perimeter of the second major face 908 to a perimeter of the first major face 906, resulting in the first major face 906 having less area than the second major face 908. As with the embodiments above, the polymer overmold 904 attaches only to the minor face 909, and does not attach to either the first major face 906 or the second major face 908.

Figure 10:
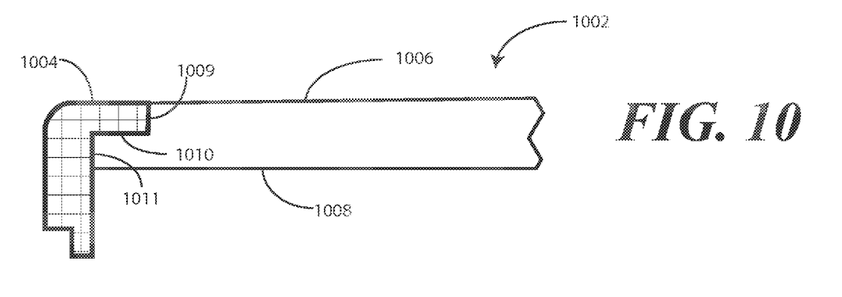
FIG. 10 illustrates a sectional view of one explanatory embodiment of one insert molded part configured in accordance with one or more embodiments of the disclosure.

Turning to FIG. 10, illustrated therein is an apparatus where the glass layer 1002 has a first major face 1006, a second major face 1008, and one or more minor faces 1009, 1010,1011. In this embodiment, the rear face 1008 again has less area than the front face 1006 due to the fact that the minor faces 1009,1010,1011 are stair-stepped inward from an outer perimeter of the rear face 1008 to the outer perimeter of the front face 1006. In this illustrative embodiment, there is a single stair step. However it will be obvious to those of ordinary skill in the art that the minor faces 1009,1010,1011 could define more stair steps.

Figure 11:
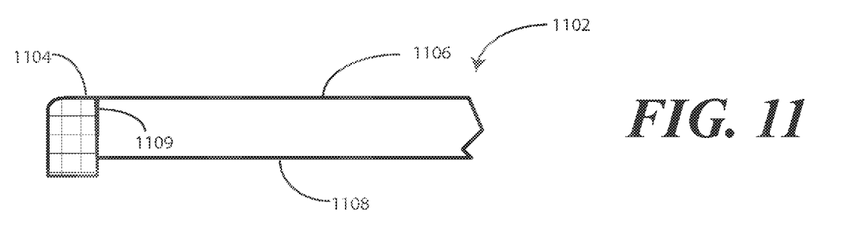
FIG. 11 illustrates a sectional view of one explanatory embodiment of one insert molded part configured in accordance with one or more embodiments of the disclosure.

Turning now to FIG. 11, illustrated therein is an apparatus where the glass layer 1102 has a first major face 1106, a second major face 1108, and one or more minor faces 1109. In this illustrative embodiment, the minor face 1109 has a linear shape. The illustrative linear shape is vertical from a perimeter of the second major face 1108 to a perimeter of the first major face 1106, resulting in the first major face 1106 having the same area as the second major face 1108. The polymer overmold 1104 attaches only to the minor face 1109, and does not attach to either the first major face 1106 or the second major face 1108.

Figure 12:
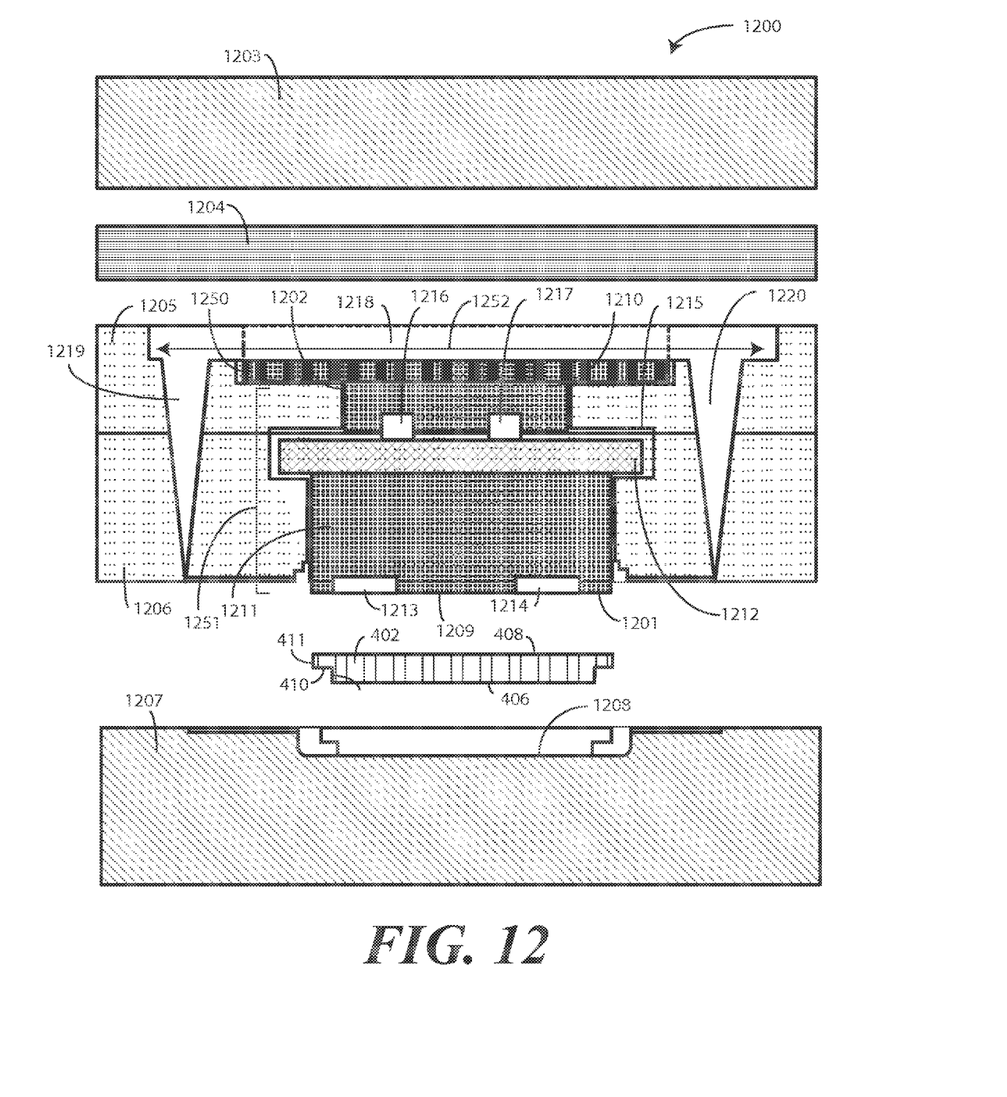
FIG. 12 illustrates a tool configured in accordance with one or more embodiments of the disclosure executing a step of a method in accordance with one or more embodiments of the disclosure.

The embodiments of FIGS. 4-11 can be manufactured using a tool configured in accordance with one or more embodiments of the disclosure. Turning now to FIG. 12, illustrated therein is one explanatory embodiment of such a tool 1200. The novel and non-obvious tool 1200 of FIG. 12 advantageously includes a floating core insert 1201 that is allowed to "float," e.g., translate longitudinally (vertically as viewed in FIG. 12) within the cavity 1202 of the tool 1200.

In one or more embodiments, the tool 1200 comprises a three plate cold runner mold. This means that two backing plates 1203,1204 are separable from the mold plates 1205, 1206, which are bolted together in this illustrative embodiment. Advantageously, allowing the floating core insert 1201 and, optionally, the two backing plates 1203,1204 to float allows pressure applied in the runner system via introduction of polymeric material to be used to press the glass layer 402 against the core block 1207. By pressing the front face 406 of the glass layer 402 against a seating plane 1208 of the core block 1207, and by covering the rear 408 with the bottom surface 1209 of the floating core insert 1201, the glass layer 402 can be held in place while polymeric material couples to only the minor faces 409,410,411 of the glass layer 402. This is in contrast to prior art designs where polymeric material had to attach to the major faces for proper adhesion in the tool. Accordingly, the compressive force applied by the floating core insert 1201 allows for thinner, sleeker designs with improved cosmetics.

The floating core insert 1201 of this illustrative embodiment includes several components. In this embodiment, the floating core insert 1201 includes, generally, a block 1251 and a runner plate 1250. The runner plate 1250 of this explanatory embodiment defines at least one side of the runner channel 1252 defined by the tool when the floating core insert 1201 is placed within the tool 1200.

The block 1251 of this illustrative embodiment is segmented into components that include an upper block 1212 and a lower block 1211. An optional flange 1212 is disposed between the upper block 1212 and the lower block 1211. As can be seen in FIG. 12, the runner plate 1250 is wider than any of the components of the block 1251. In this illustrative embodiment, the runner plate 1250 is also wider than the flange 1212.

The lower block 1211 of this illustrative embodiment includes two compressible pads 1213,1214 that limit lateral movement of the glass layer 402 when in the core block 1207. The compressible pads 1213,1214 are optional. Additionally, one, three, four, or more compressible pads can be used in various embodiments.

Above the lower block 1211 is the flange 1212. The flange 1212 extends laterally beyond the lower block 1211 or the upper block 1210 in this embodiment. The flange 1212 sits within a recess 1215 of mold plate 1206. Note that the runner plate 1250 also sits within this recess 1215 in this embodiment. In other embodiments, the runner plate 1250 may sit within a recess that is separate from recess 1215.

As noted above, the floating core insert 1201 is allowed to float, or translate longitudinally, within the cavity 1202. Inclusion of the flange 1212, which is optional, provides a mechanical device that limits the amount of longitudinal translation that occurs. For example, if the floating core insert 1201 moves too far up or down (as viewed in FIG. 12), the flange will hit the floor or ceiling walls of the recess 1215. Accordingly, the floor and ceiling walls of the recess 1215 serve as a mechanical stop to prevent the flange 1212, and correspondingly the floating core insert 1201 from moving beyond a predetermined threshold within the tool 1200. In one embodiment, the predetermined threshold is about 0.15 millimeters. In another embodiment, the predetermined threshold is 0.10 millimeters.

In one embodiment, the upper block 1210 is spring biased against either the flange 1212 or the lower block 1211. In this illustrative embodiment, two springs 1216,1217 are disposed between the upper block 1210 and the flange 1212. These two springs 1216,1217 can cause a preloading force to be applied to the glass layer 402 when the tool 1200 is closed in one embodiment. In other embodiments, the two springs 1216, 1217 provide a pre-seating function. When pressure from the injected polymer material reaches the upper block 1210, the there can be solid contact between the upper block 1210 and the lower block 1211. Where this occurs, pressure against the glass layer 402 is applied primarily from injected polymer material applying pressure to the runner plate 1250.

In one embodiment, a runner 1218 is defined by the runner plate 1250. In one embodiment, the runner plate 1250 is a separate component coupled to the upper block 1210. However, in another embodiment, the runner plate 1250 and upper block 1210 are a single component. For example, the upper block 1210 can be T-shaped with the runner 1218 cut into the upper block 1210 of the floating core insert 1201.

When polymeric material is introduced into the tool 1200, it flows through the runner 1218 of the floating core insert 1201 into the other runners 1219,1220 of the tool. By having a runner plate 1250 that is wider than the block 1251, the surface area that the polymeric material contacts is increased. Accordingly, this wider runner plate 1250 results in an increased holding force against the glass layer 402.

The pressure with which the polymeric material is introduced into the tool can be adjusted to apply an additional loading force on the glass layer 402. Said differently, when polymeric material passes through the runner 1218 of the runner plate 1250, the pressure causes the floating core insert to press downward against the glass layer 402. This pressure, combined with the preloading force of the springs 1216,1217 retain the glass layer 402 in a constant location within the core block 1207.

In one embodiment, the various components of the floating core insert 1201 are configured to apply a preloading force against a first major face of the glass layer 402, preclude an overmolding operation on the first major face, and allow overmolding only on minor faces of the glass layer 402 when polymeric material is injected into remaining portions of the cavity not filled by the glass layer and the floating core insert, i.e., runners 1218,1219,1220. In one embodiment, by allowing the floating core insert 1201 and the two backing plates 1203,1204 to float, pressure in the runner system, i.e., in runners 1218,1219,1220, can be used to press the glass plate against the seating plane 1208 of the core block 1207. Embodiments of the disclosure can be used any shape of glass layer 402, including the various glass layer embodiments described above.

Figure 13:
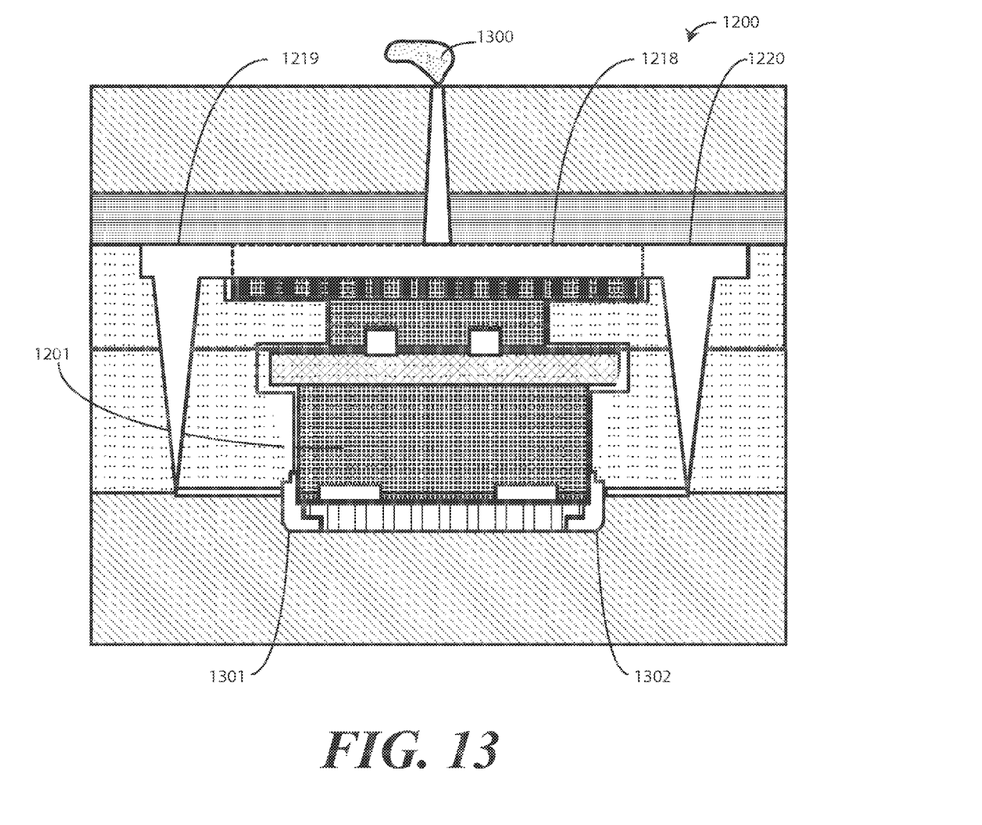
FIG. 13 illustrates a tool configured in accordance with one or more embodiments of the disclosure executing a step of a method in accordance with one or more embodiments of the disclosure.
Figure 14:
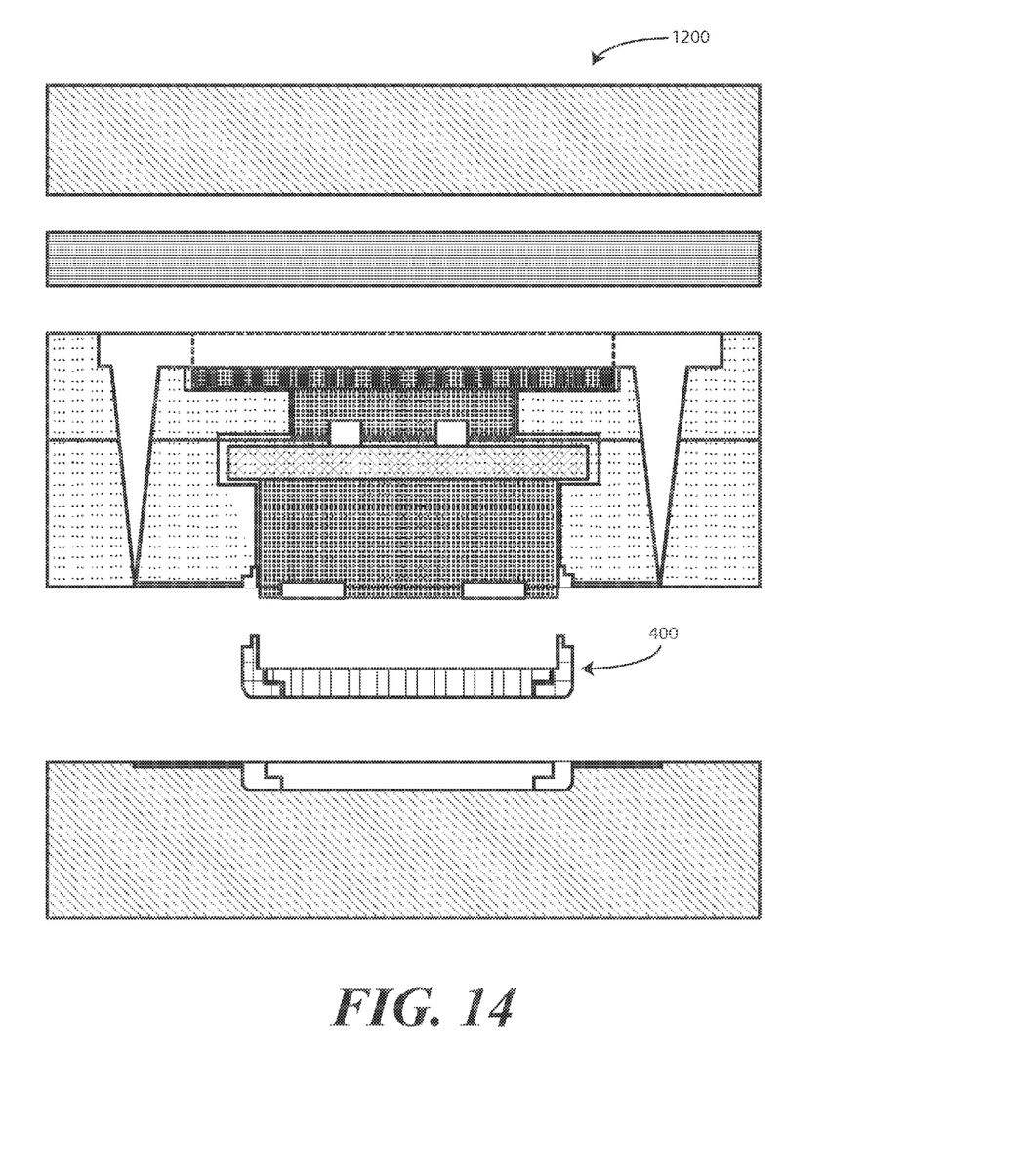
FIG. 14 illustrates a tool configured in accordance with one or more embodiments of the disclosure executing a step of a method in accordance with one or more embodiments of the disclosure.

FIGS. 12-14, collectively, also illustrate a method for manufacturing an apparatus configured in accordance with embodiments of the disclosure as well. At FIG. 12, a first step is being performed. Specifically, the glass layer 402 is being positioned in the cavity 1202 of the tool 1200. At this step, the floating core insert applies a preloading force against a first major face (the rear face 408 in this example) of the glass layer 402 to hold the glass layer 402 in place in core block 1207.

At FIG. 13, the tool 1200 is closed. Polymeric material 1300 is then introduced into the runners 1218,1219,1220 by injection. This introduction applies an additional loading force against the first major face by way of the pressure applied from the polymeric material 1300 passing through the runner 1218 in the floating core insert 1201. It further causes the polymeric material 1300 to fill the voids 1301,1302 of the core so as to become the polymer overmold (404) of the resulting apparatus. In one embodiment, the introduction of the polymeric material 1300 is done in a controlled manner so as to regulate the application of the additional loading force. For example, in one embodiment, the injecting comprises altering an introduction force of the polymeric material 1300 into the mold or tool 1200 across time. This can include, in one embodiment, introducing the polymeric material 1300 into the cavity 1202 with a lesser force at an earlier time and a greater force at a later time. At FIG. 14, the tool 1200 is opened, thereby revealing the finished apparatus 400.

Figure 15:
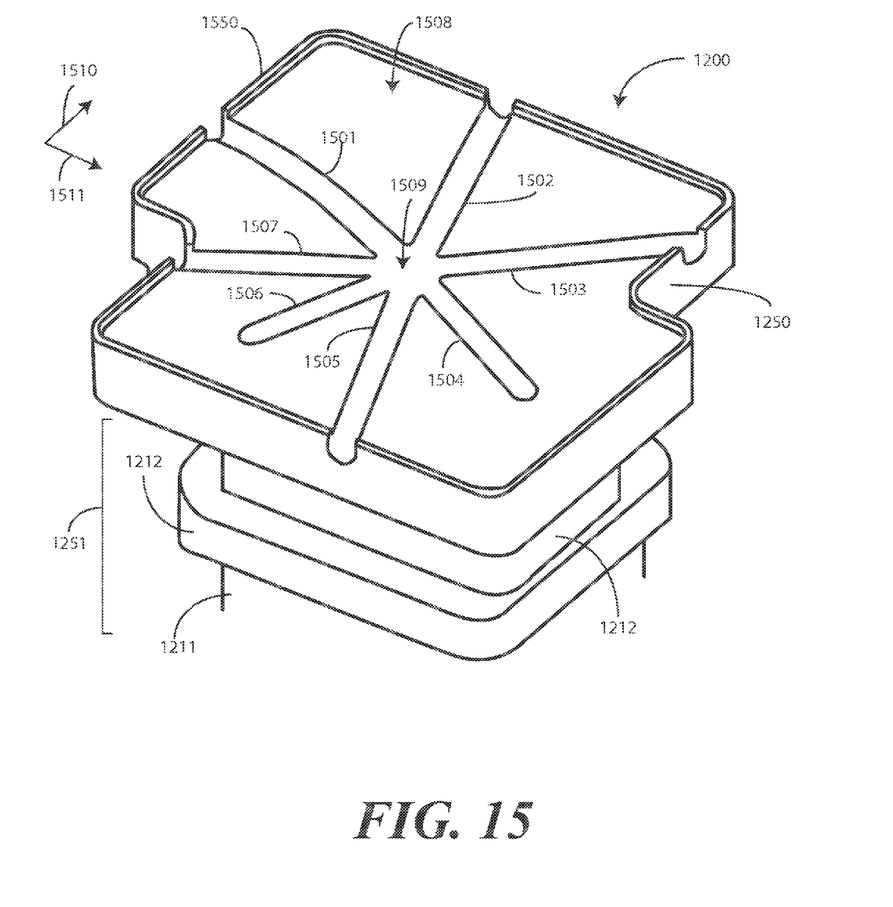
FIG. 15 illustrated a perspective view of portions of one explanatory floating core insert configured in accordance with one or more embodiments of the disclosure.

Turning now to FIG. 15, illustrated therein is a perspective view of portions of the floating core insert 1201 from FIG. 12. As noted above, the floating core insert 1201 of this illustrative embodiment includes several components. In this embodiment, the floating core insert 1201 includes, generally, a block 1251 and a runner plate 1250. The runner plate 1250 of this explanatory embodiment defines one or more runner channels 1501,1502,1503,1504,1505,1506,1507 and a runner well 1508. The runner channels 1501,1502,1503, 1504,1505,1506,1507 of this embodiment intersect at a hub 1509 disposed within the runner well 1508. The runner well 1508 is understood to completely flood with plastic, to provide extra downward force on the floating assembly.

The block 1251 of this illustrative embodiment is segmented into components that include an upper block 1212 and a lower block 1211. An optional flange 1212 is disposed between the upper block 1212 and the lower block 1211. As can be seen in FIG. 15, the runner plate 1250 is wider in both the x dimension 1510 and the y dimension 1511 than any of the components of the block 1251. In this illustrative embodiment, the runner plate 1250 is also wider in both the x dimension 1510 and the y dimension 1511 than the flange 1212.

When the runner plate 1250 is wider than the block 1251, and the floating core insert 1201 is placed within a mold and polymeric material is injected therein, the polymeric material passes along the runner plate 1250 to apply an additional loading force to substrates disposed beneath the block 1251.

In the illustrative embodiment of FIG. 15, the runner plate 1250 defining a polygonal perimeter 1550 having more than four sides. In this illustrative embodiment, the polygonal perimeter 1550 has eight sides. This illustrative polygonal perimeter 1550 is referred to as a "double quadrilateral" perimeter because it resembles two quadrilaterals that overlap. Other polygonal and non-polygonal shapes for the perimeter of the runner plate 1250 will be obvious to those of ordinary skill in the art.

Figure 16:
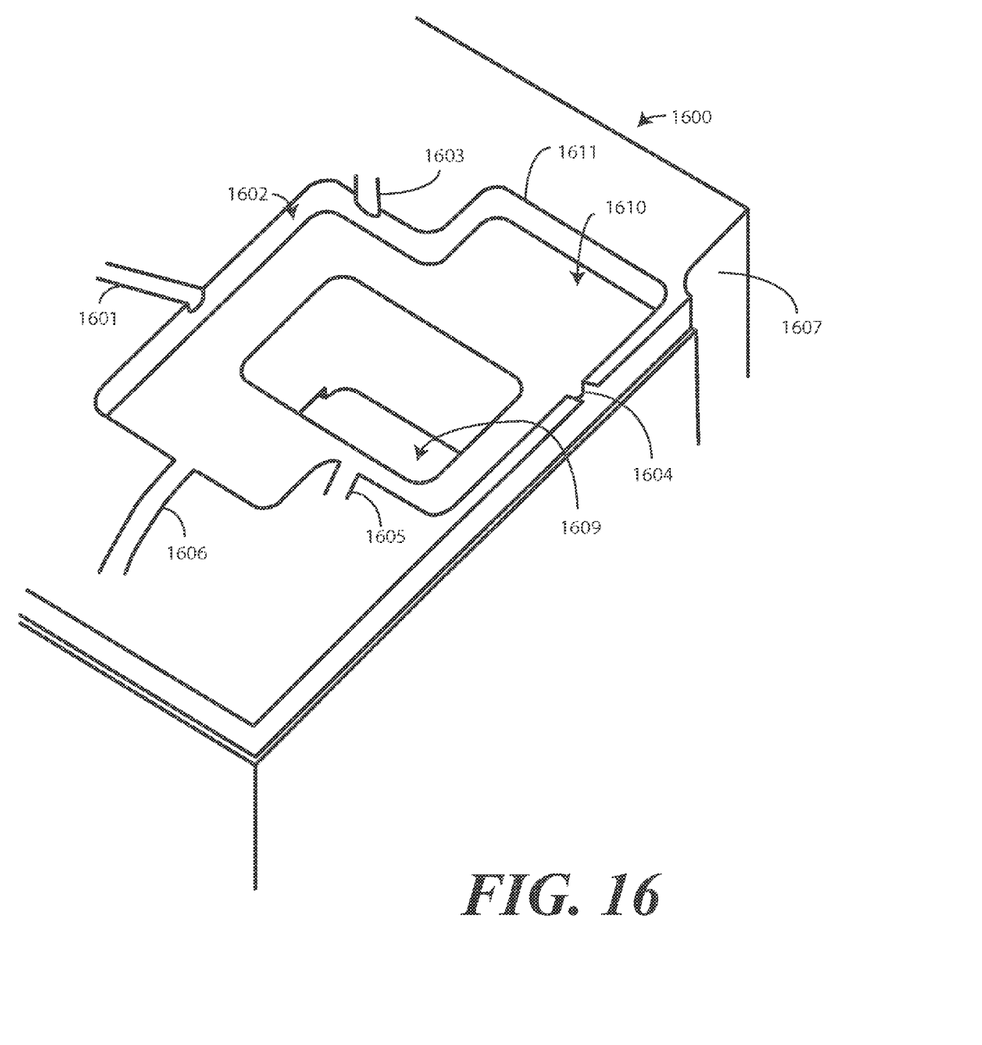
FIG. 16 illustrates an explanatory portion of a tool configured in accordance with one or more embodiments of the disclosure.

Turning to FIG. 16, illustrated therein is a perspective view of a portion of a core block 1607 of a mold 1600 configured to accommodate the floating core insert (1201) of FIG. 15. As shown in FIG. 16, the core block 1607 defines a cavity 1602 and one or more runners 1601,1603,1604,1605,1606. The cavity 1602 defines a recess 1609 into which the block (1251) can be placed within the mold 1600. The recess 1609 also includes and upper, expanded recess 1610 for receiving the runner plate (1250) of the floating core insert (1201) as well. In this illustrative embodiment, a perimeter 1611 of the upper, expanded recess 1610 defines a polygonal perimeter having more than four sides. In this illustrative embodiment, the polygonal perimeter has eight sides, and is thus a "double quadrilateral" perimeter.

Figure 17:
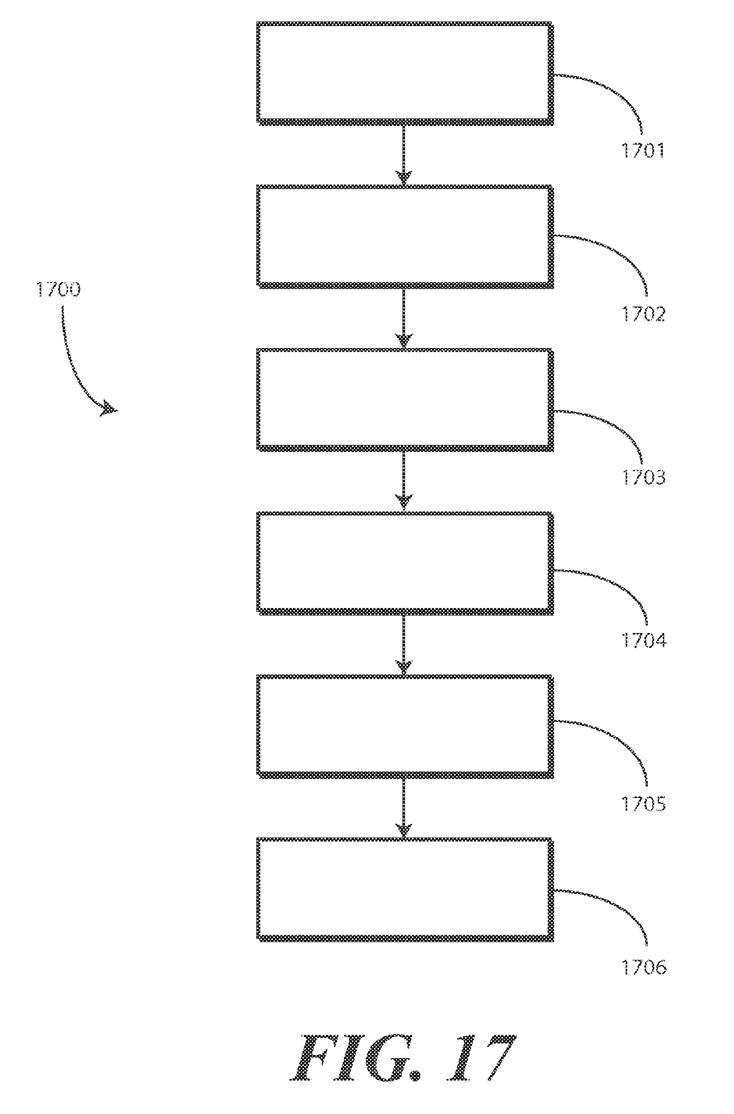
FIG. 17 illustrates an explanatory method in accordance with one or more embodiments of the disclosure.

Turning now to FIG. 17, illustrated therein is a flow chart of another method 1700 of manufacturing in accordance with one or more embodiments of the disclosure. At step 1701 a substrate layer is positioned in the cavity of a tool or mold. In one embodiment, the tool or mold defines a runner channel to receive polymeric material during the molding process.

At step 1702, a floating core insert is placed in the cavity. In one embodiment, the floating core insert defines a block and a runner plate. In one embodiment, the runner plate is wider than the block. In one embodiment, the runner plate further forms at least one side of the runner channel when the floating core insert is in the cavity. In one embodiment, the floating core insert is to apply a preloading force against a first major face of a substrate layer disposed within the cavity.

In one embodiment, an additional force is applied at step 1702 by one or more springs of the floating core insert disposed between a first portion of the floating core insert and a second portion of the floating core insert. In one or more embodiments, this step 1702 includes allowing the floating core insert to float within the cavity during the molding process.

At optional step 1703, lateral movement of the substrate layer within the cavity is reduced. In one embodiment, step 1703 is performed by disposing one or more compressible pads along the floating core insert. The one or more compressible pads can then be biased between the floating core insert and the substrate layer.

At optional step 1704, longitudinal movement or translation of the floating core insert can be limited. In one embodiment, this step 1704 includes limiting translation with a flange of the floating core insert and a recess of the mold complementary to the flange as described above. In one embodiment, the floating occurring at step 1702 is limited at step 1704 so as to be less than 0.10 millimeters.

At step 1705, polymeric material is introduced into the cavity by injection. In one embodiment, this step 1705 applies a loading force against the first major face of the substrate layer by passing the polymeric material through a runner defined in the runner plate of the floating core insert. As noted above, this step 1705 can be performed in a controlled manner. For example, in one embodiment this step includes altering an introduction force of the polymeric material into the mold across time. In one embodiment, this step 1705 includes introducing the polymeric material into the cavity with a lesser force at an earlier time and a greater force at a later time. At this step 1705 the polymeric material forms an overmold on the substrate layer by attaching to only the minor faces. At step 1706, the mold or tool is opened and the apparatus is removed.

Figure 18:
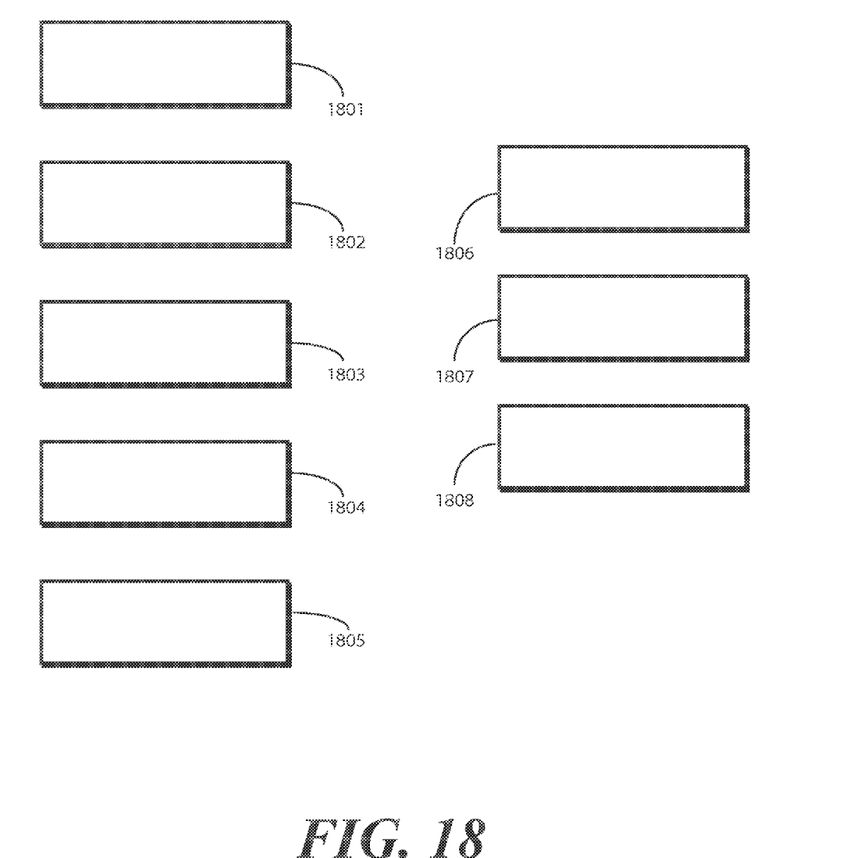
FIG. 18 illustrates various embodiments of the disclosure.

FIG. 18 illustrates various embodiments of the disclosure. At 1801, a tool comprises a mold. In one embodiment, the mold defines a cavity to receive a substrate layer and a runner to receive polymeric material. At 1801 the tool also includes a floating core insert. In one embodiment, the floating core insert comprises a block a runner plate. In one embodiment, the runner plate is wider than the block. The runner plate can work to apply a loading force against a first major face of the substrate layer when the polymeric material is injected into the runner At 1802, the block of 1801 precludes an overmolding operation on the first major face. In one embodiment, at 1602 the block of 1601 allows overmolding only on minor faces of the substrate layer when polymeric material is injected into runners of the mold.

At 1803, the block of 1801 comprises one or more springs to apply an additional loading force to the first major face. At 1804, the runner plate of 1801 defines one or more channels to receive the polymeric material. At 1805, each of the one or more channels from 1804 intersect at a hub. At 1805, the floating core insert of 1801 comprises a flange. Optionally at 1805, the cavity of 1801 defines a recess complementary to the flange to limit longitudinal movement of the flange. At 1806, the tool of 1801 comprises a three plate cold runner mold. At 1807, the block of 1801 comprises one or more compressible pads biased between the floating core insert and the substrate layer. At 1808 the runner plate of 1801 defines a double quadrilateral perimeter.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
    placing a floating core insert in a cavity of a mold to apply a preloading force against a first major face of a substrate layer disposed within the cavity;
    the mold defining a runner channel;
    the floating core insert defining a block and a runner plate, the runner plate wider than the block, the runner plate further defining at least one side of the runner channel when the floating core insert is in the cavity; and
    injecting polymeric material into the runner channel to apply an additional loading force by passing the polymeric material along the runner plate.

2. The method of claim 1, the polymeric material forming an overmold for the substrate layer on only minor faces of the substrate layer.

3. The method of claim 1, the injecting comprising altering an introduction force of the polymeric material into the mold across time.

4. The method of claim 3, the altering comprising introducing the polymeric material into the cavity with a lesser force at an earlier time and a greater force at a later time.

5. The method of claim 1, further comprising reducing lateral movement of the substrate layer in the cavity.

6. The method of claim 5, the reducing with one or more compressible pads biased between the block and the substrate layer.

7. The method of claim 1, the floating core insert to apply the preloading force with one or more springs.

8. The method of claim 1, further comprising limiting longitudinal translation of the floating core insert.

9. The method of claim 8, the limiting with a flange of the floating core insert and a recess of the mold complementary to the flange.

10. The method of claim 1, further comprising floating the floating core insert in the cavity.

11. The method of claim 1, the runner plate defining a polygonal perimeter having more than four sides.

12. A tool, comprising:
    a mold, the mold defining:
        a cavity to receive a substrate layer; and
        a runner to receive polymeric material; and
    a floating core insert, comprising:
        a block; and
        a runner plate;
        the runner plate wider than the block;
        the runner plate to:
            apply a preloading force against a first major face of the substrate layer when the polymeric material is injected into the runner.

13. The tool of claim 12, the block to preclude an overmolding operation on the first major face and allow overmolding only on minor faces of the substrate layer when the polymeric material is injected into runners of the mold.

14. The tool of claim 13, the block comprising one or more springs to apply an additional loading force to the first major face.

15. The tool of claim 12, the runner plate defining one or more channels to receive the polymeric material.

16. The tool of claim 15, each of the one or more channels intersecting at a hub.

17. The tool of claim 12, the floating core insert comprising a flange, the cavity defining a recess complementary to the flange to limit longitudinal movement of the flange.

18. The tool of claim 12, the mold comprising a three plate cold runner mold.

19. The tool of claim 12, the block comprising one or more compressible pads biased between the floating core insert and the substrate layer.

20. The tool of claim 12, the runner plate defining a double quadrilateral perimeter.

* * * * *